United States Patent
Reisel et al.

(10) Patent No.: US 6,708,983 B2
(45) Date of Patent: Mar. 23, 2004

(54) SPIRAL WOUND CYLINDER HEAD GASKET

(75) Inventors: Robert Reisel, Mt. Prospect, IL (US); Michael Sadowski, Elmhurst, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/037,052

(22) Filed: Nov. 1, 2001

(65) Prior Publication Data

US 2003/0080517 A1 May 1, 2003

(51) Int. Cl.⁷ ................................................. F02F 11/00
(52) U.S. Cl. .................. 277/592; 277/598; 277/610; 277/633; 277/650
(58) Field of Search .................. 277/592, 610, 277/633, 616, 617, 601, 600, 598, 650

(56) References Cited

U.S. PATENT DOCUMENTS

| | | | |
|---|---|---|---|
| 2,027,299 A | * | 1/1936 | Bohmer, Jr. et al. ......... 277/609 |
| 2,442,312 A | * | 5/1948 | Price .......................... 277/610 |
| 2,442,313 A | | 5/1948 | Price |
| 3,336,035 A | | 8/1967 | Price |
| 3,521,607 A | * | 7/1970 | Wiseman et al. ......... 123/193.3 |
| 3,815,927 A | * | 6/1974 | Geipel ....................... 277/610 |
| 4,019,244 A | | 4/1977 | Owen et al. |
| RE29,702 E | | 7/1978 | Owen et al. |
| 4,189,819 A | * | 2/1980 | Nicholson ................ 228/141.1 |
| 4,244,330 A | * | 1/1981 | Baugh et al. ............ 123/193.2 |
| 4,364,982 A | | 12/1982 | Gee |
| 4,548,165 A | * | 10/1985 | Vorobiev et al. ......... 123/41.84 |
| 4,673,187 A | | 6/1987 | Hanson et al. |
| 4,796,351 A | | 1/1989 | Gee |
| 5,082,296 A | | 1/1992 | Aizawa et al. |
| 5,161,807 A | | 11/1992 | Allen et al. |
| 5,226,662 A | | 7/1993 | Justus |
| 5,275,423 A | | 1/1994 | Allen et al. |
| 5,308,090 A | | 5/1994 | Hamada et al. |
| 5,511,797 A | | 4/1996 | Nikirk et al. |
| 5,527,047 A | | 6/1996 | Waterland, III |
| 5,582,144 A | * | 12/1996 | Mizutani ................ 123/193.2 |
| 5,645,284 A | | 7/1997 | Fitton |
| 5,664,791 A | | 9/1997 | Owen |
| 5,669,613 A | | 9/1997 | Lubienski |
| 5,683,091 A | | 11/1997 | Isoe et al. |
| 5,823,542 A | | 10/1998 | Owen |
| 5,913,522 A | | 6/1999 | Koch |
| 5,921,558 A | | 7/1999 | Kozerski |
| 5,944,322 A | | 8/1999 | Coff et al. |
| 5,997,007 A | | 12/1999 | Hanashima et al. |
| 6,113,109 A | | 9/2000 | Lieb et al. |
| 6,116,198 A | * | 9/2000 | Kirtley et al. ........... 123/193.3 |
| 6,121,360 A | | 9/2000 | Hoyes et al. |
| 6,250,646 B1 | * | 6/2001 | Chang ........................ 277/603 |

FOREIGN PATENT DOCUMENTS

GB    1452166    * 10/1976

* cited by examiner

Primary Examiner—Alison K. Pickard
(74) Attorney, Agent, or Firm—Howard & Howard

(57) ABSTRACT

A gasket having a plurality of superposed windings of a profiled metal strip spirally wound upon itself around a central axis, a plurality of windings of a strip of graphite interposed between at least some of the superposed windings of the metal strip, and a solid ring of graphite on the O.D. Two or more of the radially intermost windings on the I.D. are in surface-to-surface contact with each other without interposed sealing material.

4 Claims, 1 Drawing Sheet

SPIRAL WOUND CYLINDER HEAD GASKET

FIELD OF THE INVENTION

This invention relates generally to gaskets, and more particularly to a spiral wound cylinder head gasket for providing a combustion seal.

BACKGROUND OF THE INVENTION

Typically, a spiral wound cylinder head gasket has a combination of alternating strips of metal and a sealing material. The metal strip is usually profiled longitudinally to provide the assembled spiral with a degree of controlled axial compressibility. The gasket provides a combustion seal for a cylinder or cylinders in the engine block of an internal combustion engine.

SUMMARY OF THE INVENTION

In accordance with the present invention, a cylinder head gasket has a metal strip which is spirally wound upon itself, with a strip of a sealing material such as graphite interposed between some of the windings of the metal strip. Two or more of the innermost windings on the internal diameter (I.D.) of the metal strip are in surface-to-surface contact without interposed sealing material. A solid ring of sealing material on the O.D. completes the gasket. The tightly wound metal on the I.D. improves the high pressure sealing of gases by creating a stiff and relatively rigid seal, while the molded sealing material on the O.D. improves the sealing of fluids by providing a relatively soft and readily conformable seal to accommodate the changes in the operating conditions and any movement of mating components of the engine, such as the engine block and a combustion cylinder liner.

One object of this invention is to provide a cylinder head gasket having the foregoing features and capabilities.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
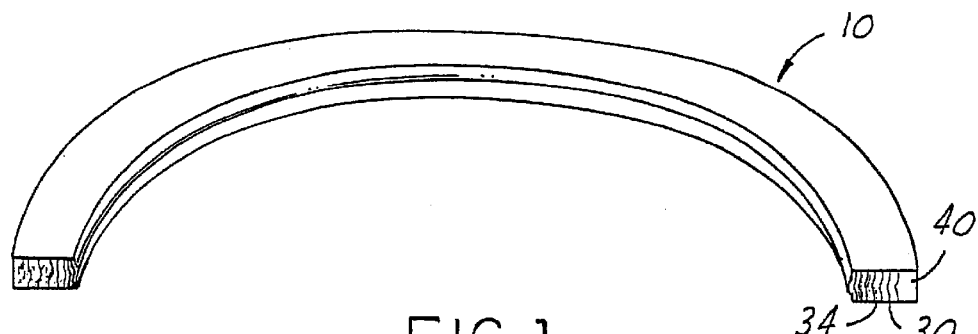
FIG. 1 is a sectional view showing a spiral wound cylinder head gasket, partly in perspective and partly in section, constructed in accordance with the present invention.
Figure 2:
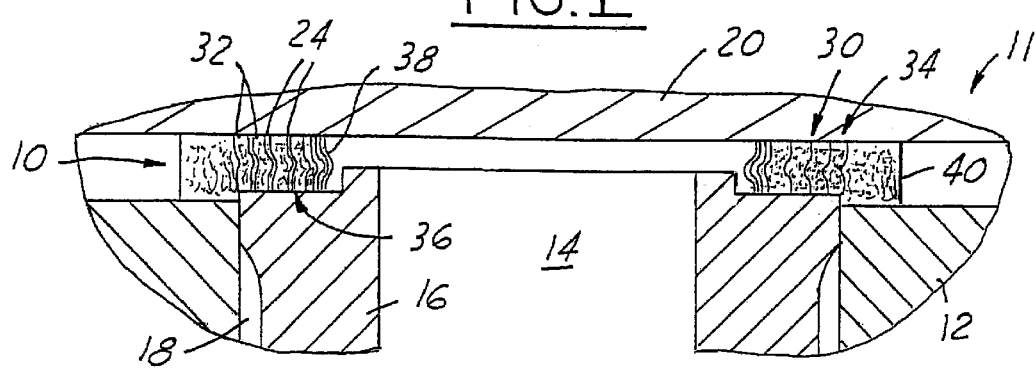
FIG. 2 is a sectional view of an engine block and cylinder head incorporating the gasket shown in FIG. 1.
Figure 3:
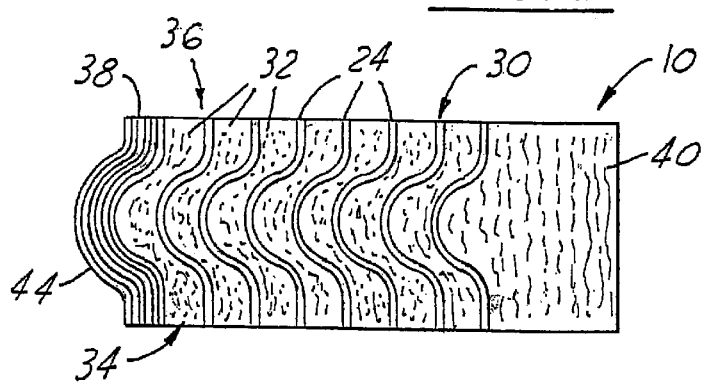
FIG. 3 is an enlargement of a portion of the gasket shown in FIGS. 1 and 2.

Referring now more particularly to the drawings, and especially to FIGS. 1–3, the gasket of this invention is indicated by the reference numeral 10 and in FIG. 2 is shown in an engine 11 having an engine block 12 provided with one or more combustion cylinders 14, with a cylindrical liner 16 in each cylinder. A water jacket 18 is defined between the liner and the cylinder. A cylinder head 20 extends across the outer end of the cylinder 14. The gasket 10 is shown interposed and compressed between the engine block 12, the liner 16, and the cylinder head 20.

The gasket 10 includes a plurality of superposed windings 24 of a metal strip 30 spirally wound upon itself around a central axis, with a plurality of windings 32 of a strip 34 of sealing material, preferably graphite, interposed between some of the superposed windings of the metal strip to provide a composite metal and sealing strip annulus 36. Several windings 38 of the metal strip on the internal diameter (I.D.) of the gasket 10 are in metal to metal contact with each other without any interposed sealing material to create a stiff and relatively rigid seal which is highly effective in the high pressure sealing of gases emitted in the combustion process.

Surrounding the metal and sealing strip annulus 36 is a solid or molded ring 40 of sealing material, again preferably graphite, which is secured to the metal of the annulus on the outside diameter (O.D.) in co-planar, concentric relationship therewith. The graphite ring 40 improves the sealing of fluids by providing a relatively soft and readily conformable seal to accommodate for changes in the operating conditions and any movement of the liner 16 relative to the engine block 12.

As shown in FIG. 2, the gasket 10 bridges the joint between the engine block 12 and the liner 16. In this relationship of the parts, the gasket is highly effective in preventing the escape of gases and fluids resulting from combustion occurring in the cylinder 14.

It will be noted that the metal strip is profiled to provide a grooved configuration 44 centrally along its length to make the gasket more readily compressible when clamped between the engine block and cylinder head which is in accordance with conventional practice. Typically the groove is profiled so that the convex side is exposed on the I.D., as shown in FIG. 2.

Figures 4, 5:
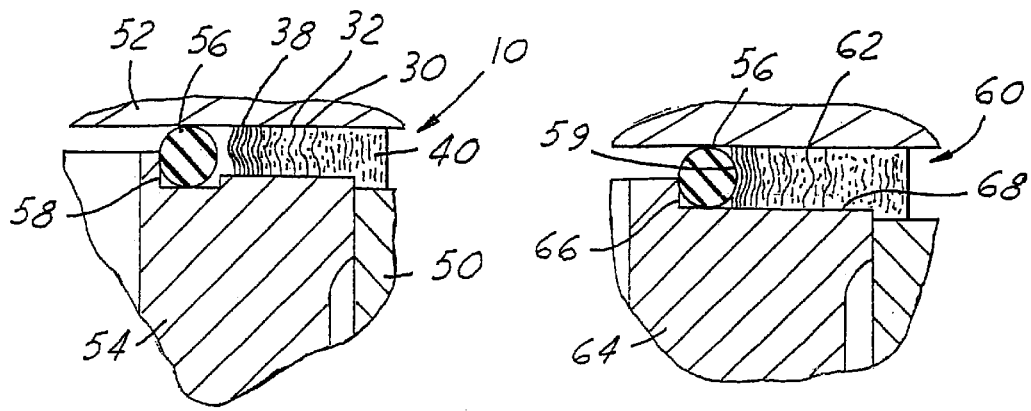
FIG. 4 is an enlarged fragmentary sectional view of a portion of an engine block and cylinder head, showing the gasket of FIGS. 1 and 2, with the addition of a wire ring.
FIG. 5 is a fragmentary sectional view of an engine block and cylinder head showing a gasket of modified construction.

FIG. 4 shows the gasket 10 in an engine having an engine block 50, cylinder head 52 and cylinder liner 54 of generally similar construction to that shown in FIG. 2, but the gasket 10 is positioned radially outwardly of a wire ring 56 of steel or the like seated in a recess 58 in the outer end of the liner 54 and clamped between the liner and cylinder head.

FIG. 5 shows a gasket 60 in which the concave side 59 of the profile of the metal strip 62 faces radially inwardly rather than outwardly, and is exposed. Otherwise the gasket 60 is like the gasket 10. In the FIG. 5 construction, the engine construction is the same as in FIG. 4, except that the outer end of the liner 64 does not have a recess but instead has a vertical wall 66 extending outwardly from the outer end 68 of the liner. The wire ring 56 may be snapped into position between the vertical wall 66 and the concave side 59 of the profile on the I.D. of the metal strip to releasably lock the wire ring 56 in position.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A gasket comprising a plurality of a profiled metal strip spirally wound upon itself around a central axis, a plurality of windings of a strip of sealing material interposed between at least some of the superposed windings of the metal strip to provide a composite metal and sealing strip annulus, and an outer-most ring of exposed sealing material having axially opposite exposed sealing surfaces and being fabricated throughout the thickness of said outer-most ring of the same material as that of the strip of sealing material secured to said annulus in co-planar, concentric relationship therewith, wherein said metal strip has two or more radially innermost windings on the inside diameter thereof which are in surface-to-surface contact with each other without interposed sealing material wherein said metal strip being profiled to provide a grooved configuration along its length with a concave side of the grooved configuration facing radially outwardly, and wherein the outer-most ring extends into said concave side of the metal strip at the interface of the outer-most ring and the metal strip to mechanically lock the outer-most ring on the annulus.

2. The gasket of claim 1, wherein the sealing material of said strips and of said ring includes graphite.

3. In combination, an engine having an engine block formed with a cylinder, a cylinder liner in said cylinder, a cylinder head extending across an outer end of the cylinder, a wire ring between an outer end of the liner and the cylinder head, a gasket comprising a plurality of superposed windings of a metal strip spirally wound upon itself around a central axis and a plurality of windings of a strip of sealing material interposed between at least some of the superposed windings of the metal strip, said metal strip having two or more radially innermost windings on the inside diameter thereof which are in surface-to-surface contact with each other without interposed sealing material, said metal strip being profiled to provide a grooved configuration along its length with a concave side of the grooved configuration facing radially inwardly, said gasket being disposed between said liner and said cylinder head and surrounding said wire ring, said wire ring being snapped into position between a wall extending outwardly from the outer end of said liner and the concave side of the grooved configuration of said metal strip and releasably locked in position between said wall and the concave side of the grooved configuration of said metal strip;

said gasket having on the outside diameter thereof a ring of exposed sealing material having axially opposite exposed sealing surfaces and being fabricated throughout the thickness of said outer-most ring of the same material as that of said strip of sealing material.

4. The combination of claim 3, wherein the strip of sealing material and the ring of sealing material are made of graphite.

\* \* \* \* \*

UNITED STATES PATENT AND TRADEMARK OFFICE
CERTIFICATE OF CORRECTION

PATENT NO. : 6,708,983 B2  
DATED : March 23, 2004  
INVENTOR(S) : Robert Reisel and Michael Sadowski It is certified that error appears in the above-identified patent and that said Letters Patent is hereby corrected as shown below:

<u>Column 2,</u>  
Line 62, after "plurality" insert -- of superposed windings --.

Signed and Sealed this

Twenty-seventh Day of July, 2004

JON W. DUDAS  
*Acting Director of the United States Patent and Trademark Office*